June 19, 1923.
H. W. BARTLETT
1,459,082
PROCESS FOR PREPARING SALT AND THE LIKE
Filed April 8, 1922
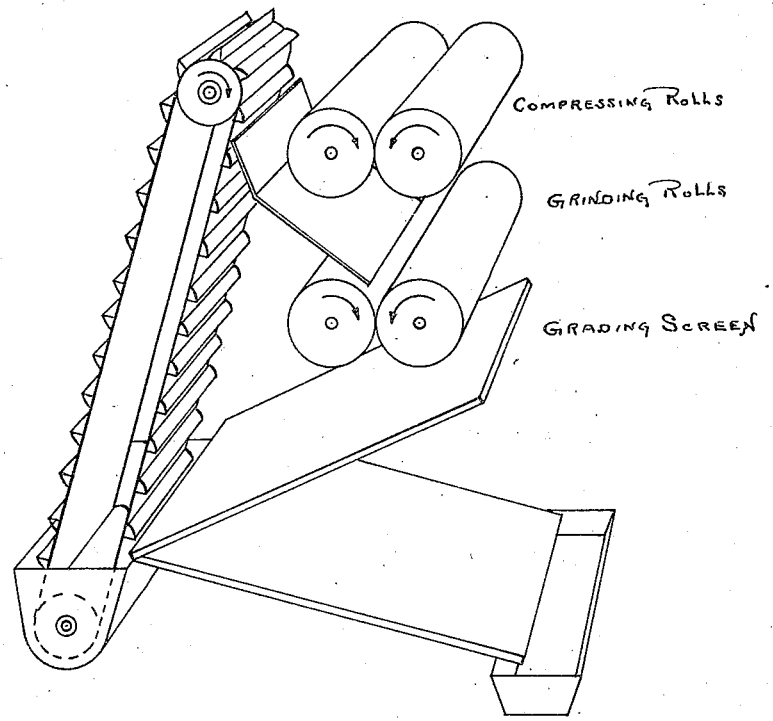

Patented June 19, 1923.

1,459,082

UNITED STATES PATENT OFFICE.

HAROLD W. BARTLETT, OF ALVARADO, CALIFORNIA, ASSIGNOR TO CONTINENTAL SALT AND CHEMICAL COMPANY, OF SAN FRANCISCO, CALIFORNIA, A CORPORATION OF CALIFORNIA.

PROCESS FOR PREPARING SALT AND THE LIKE.

Application filed April 8, 1922. Serial No. 550,864.

*To all whom it may concern:*

Be it known that I, HAROLD W. BARTLETT, a citizen of the United States, and resident of Alvarado, Alameda County, California, have invented new and useful Improvements in Processes for Preparing Salt and the like, of which the following is a specification.

My invention has for its object a process by which salt may be treated to produce a superior product for culinary and other uses whereby the tendency to cake in the packages as heretofore prepared for the market, is greatly reduced. The salt prepared by my process has exceptionally free running qualities without the introduction of any foreign substance.

A further object is the production of a purer salt for commercial and culinary use.

A further object is the recovery of salt powder or excessively fine ground salt which has heretofore been a waste product.

A further object is to compress or compact the salt into flakes, cubes or cakes of suitable size and shape to meet the various requirements of commerce.

A further object is the production of a free running table salt of whiter and superior appearance.

A further object is the production of conglomerate particles that dissolve at a greater rate than crystals of same size, this being of great advantage in salt used in butter and cheese making and certain packing industries.

These objects I attain by treating salt powder or fine ground salt, by passing it under great pressure, preferably between rollers, although other forms of presses may be used if desired. This process step compacts the salt into hard conglomerate masses and where rollers are employed the compact salt comes out in a sheet which breaks into flakes. No liquid is employed with the salt in this pressure step other than the water of crystallization which may be inherently present. I have found in some cases the application of heat directly to the salt or the rollers, during this pressing process improves the result.

A flow sheet of my process whereon is diagrammatically indicated the mechanical means for carrying it out as indicated in the accompanying drawing.

For table and culinary uses or for the market where a free running salt is desirable, these compressed masses or flakes are then ground and graded in any conventional way; the individual remaining particles are then conglomerate masses made up of the pressed original finer particles. These conglomerate masses I have discovered have the peculiar property of remaining intact; that is, they will not normally assemble themselves into larger masses, which assembling in the art heretofore, has interfered with free running; and therefore salt prepared according to my process retains the free running qualities so desirable, and this without the addition of magnesium carbonate or any other inert or foreign substance, which it has heretofore been the practice to employ.

The preparation of the salt before the compression step, may be by any treatment, to secure a fine salt or powder, much of which is derived as a by-product from the ordinary grinding and screening of salt as heretofore practiced, or the salt may with intent be ground much finer than the desired finished product. I then sift the said dry salt powder on to a pair of rollers which as the salt passes down between the rolls compresses the particles into a thin sheet.

This sheet as it emerges through the rolls on account of its brittleness rapidly breaks itself into flakes having a thickness of $\frac{1}{32}$ to $\frac{1}{16}$ of an inch. In this form the flakes are more readily soluble than masses made up of larger crystals of salt, which I believe to be due to the relatively increased exposed crystalline surface.

I now pass these flakes through a grinding mill, reducing the compressed salt particles to conglomerate masses of desired size which may be screened and graded as required. This process greatly increases the rate of dissolving of the particles. In any event the salt as now ground and screened will retain its free running qualities indefinitely and is free from the addition of any fillers or other foreign substances.

In practicing my invention for the preparation of table salt from the salt dust usually found as a by-product around the salt works I have found that such salt dust, although of a size which would pass a 200 mesh or finer, will when treated by my process and reduced to a 50 mesh size or thereabouts, produce a highly superior quality of pure, free running table salt.

Although my invention is particularly applicable to salt, I desire to be understood as claiming my process when applied to other crystalline substances and I desire to be understood as claiming the treatment either of salt powder or salt too finely ground for the market as well as the intentional fine grinding of salt to which my process herein described is applied.

I claim:

1. The process of treating a crystalline substance which consists in compressing a powder of said substance into relatively large masses and then reducing the said masses to the desired size.

2. The process of treating a crystalline substance which consists in first reducing said substance to a fine powder, then compressing said powder into relatively large masses and then reducing said masses to the required size.

3. The process of treating a crystalline substance which consists in first reducing said substance to a fine powder, then compressing said powder into relatively large masses and then grinding and screening said masses to the required size.

4. The process of treating a crystalline substance which consists in first reducing said substance to a fine powder, then passing said powder through compression rolls thereby compressing the powder into relatively large masses and then grinding and screening said masses to the required size.

5. The process of treating a crystalline substance which consists in compressing a fine powder of said substance by distributing said powder through compression rolls, whereby the powder is compressed into relatively larger masses and thereafter reducing said masses to the desired size.

6. The process of preparing salt which consists in compressing a fine powder of said salt into relatively large masses and then grinding the said masses to the desired size.

7. The process of preparing salt which consists in first reducing said salt to a fine powder, then compressing said powder into relatively larger masses and then grinding said masses to the required size.

8. The process of preparing salt which consists in first reducing said salt to a fine powder, then compressing said powder into relatively large masses and then grinding and screening said masses to the required size.

9. The process of preparing salt which consists in compressing a fine powder of said salt by distributing said powder through compression rolls whereby the powder is compressed into relatively larger masses and thereafter reducing said masses to the desired size.

HAROLD W. BARTLETT.